(12) United States Patent
Potter

(10) Patent No.: US 6,796,384 B1
(45) Date of Patent: Sep. 28, 2004

(54) IMPLEMENT MOUNTING FIXTURE

(76) Inventor: Todd K. Potter, 10267 3rd Street NE., Hanover, MN (US) 55341

( * ) Notice: Subject to any disclaimer, the term of this patent is extended or adjusted under 35 U.S.C. 154(b) by 0 days.

(21) Appl. No.: 10/424,321

(22) Filed: Apr. 28, 2003

(51) Int. Cl.⁷ .............................................. A01B 59/04
(52) U.S. Cl. ..................... 172/439; 280/461.1; 172/677
(58) Field of Search ................................ 172/439, 440, 172/441, 442, 448, 677, 679; 280/460.1, 461.1

(56) References Cited

U.S. PATENT DOCUMENTS

| | | | |
|---|---|---|---|
| 2,743,117 A | 4/1956 | Hutchings | 280/456 |
| 4,019,755 A | 4/1977 | Eisenhardt | 280/490 A |
| 4,181,181 A | 1/1980 | Old | 172/443 |
| 4,184,757 A | 1/1980 | Kondo | 354/43 |
| 4,519,623 A * | 5/1985 | Orthman | 172/439 |
| 5,423,394 A * | 6/1995 | Kendle | 180/53.3 |
| 5,707,072 A | 1/1998 | Hopper | 280/491.5 |
| 5,746,275 A | 5/1998 | Cross et al. | 172/440 |
| 5,829,536 A | 11/1998 | Pigg et al. | 172/482 |
| 5,971,082 A | 10/1999 | Satzler | 172/439 |
| 5,975,216 A * | 11/1999 | Gibbons | 172/439 |
| 5,988,294 A | 11/1999 | Hubscher | 172/453 |
| 6,089,328 A * | 7/2000 | Moore et al. | 172/447 |
| 6,257,347 B1 * | 7/2001 | Campisi | 172/439 |
| 6,443,236 B2 * | 9/2002 | Staude | 172/439 |
| 6,478,094 B2 | 11/2002 | Alexander et al. | 172/439 |
| 6,588,513 B1 * | 7/2003 | Gustafson | 172/439 |

* cited by examiner

Primary Examiner—Robert E. Pezzuto
Assistant Examiner—Alexandra Pechhold
(74) Attorney, Agent, or Firm—Nawrocki, Rooney & Sivertson, P.A.

(57) ABSTRACT

The present invention provides an implement mounting fixture for mounting an implement to a work machine. The implement mounting fixture includes a frame having a hitch tube for mounting to a work machine. A pair of upper lift arms extend outwardly from the frame on opposite sides of a transverse beam. A cylinder extends from a lower portion of the frame to the transverse beam such that a force applied by the cylinder causes the upper lift arms to pivot with respect to the frame. A link arm is pivotally connected to the frame for linking to an implement.

9 Claims, 2 Drawing Sheets

IMPLEMENT MOUNTING FIXTURE

BACKGROUND OF THE INVENTION

1. Field of the Invention

The present invention relates to the field of implement mounting fixtures.

2. Background of the Prior Art

An implement mounting fixture allows an implement to be mounted to a work machine. Implements may be used to plow, plant crops, haul materials, and/or perform a variety of other types of work. A variety of work machines are available for use with implements including trucks, small horse power tractors, all-terrain vehicles, small maintenance vehicles, and the like.

A problem with the prior art implement mounting fixtures is that they often have multiple points of attachment to the work machine. This results in an implement mounting fixture that can be mounted to one work machine, and is incompatible with another work machine. Additionally, a large number of implement mounting fixtures are designed to fit exclusively on the rear of the work machine, requiring a separate implement mounting fixture for the front of the work machine.

It would be advantageous to provide an implement mounting fixture that addresses these problems, and to provide an implement mounting fixture that possesses other advantages over the prior art.

SUMMARY OF THE PRESENT INVENTION

The present invention provides an implement mounting fixture for mounting an implement to a work machine. The implement mounting fixture has a frame having an upper and lower portion. A pair of upper lift arms extend from the upper portion of the frame. A pair of lower lift arms extend from the lower portion of the frame. Each upper lift arm is adjustably linked to a corresponding lower lift arm by an adjustable lift arm. A lift arm pivotally extends from the frame for linking to an implement. A transverse beam extends between the pair of upper lift arms. A cylinder extends from the lower portion of the frame to the transverse beam. In operation, the cylinder applies a force to the transverse beam, thus causing the upper lift arms to pivot with respect to the frame. The force is translated to the lower lift arms via the adjustable lift arms connected thereto.

A hitch tube extends from the frame for receiving a hitch of a work machine. The hitch tube allows the implement mounting fixture to be mounted to the front or back of a variety of work machines by receiving a hitch from the work maching.

DETAILED DESCRIPTION OF THE PREFERRED EMBODIMENTS

Figure 1:
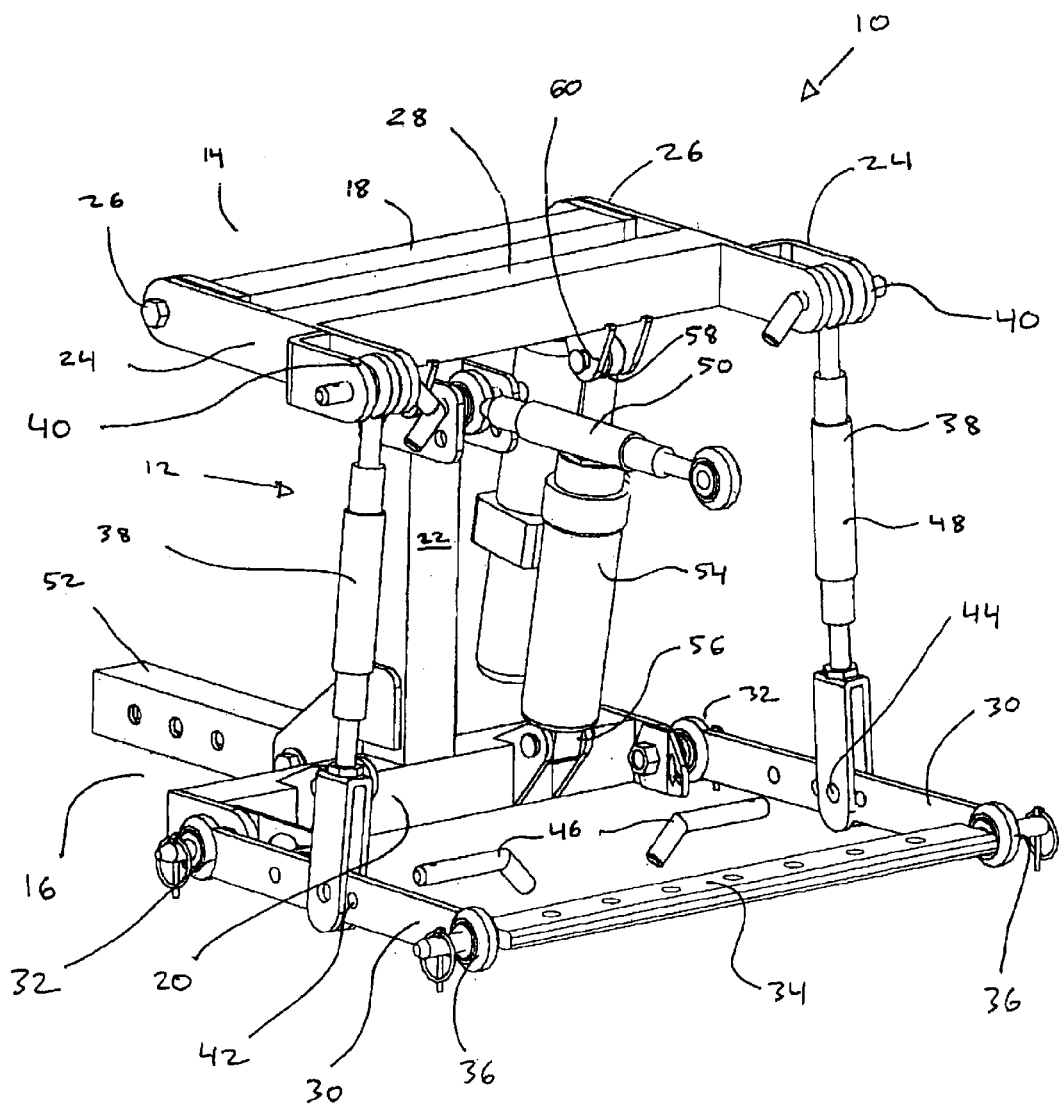
FIG. 1 is a perspective view of a first embodiment of the present invention.

FIG. 1 illustrates a first embodiment of an implement mounting fixture for mounting an implement to a work machine.

The implement mounting fixture 10 has a frame 12 having an upper portion 14 and a lower portion 16. The frame 12 has an upright member 22 that connects to an upper crossbar 18 in the upper portion 14 of the frame 12 and a lower crossbar 20 in the lower portion 16 of the frame 12. The upper crossbar 18 and lower crossbar 20 are generally parallel to each other and perpendicular to the upright member 22.

A pair of upper lift arms 24 extend from the upper portion 14 of the frame 12. The upper lift arms 24 have a first end 26 pivotally connected to the upper portion 14 of the frame 12. The upper lift arms 24 are connected to opposing sides of the upper portion 14 of the frame 12. The upper lift arms 24 extend outwardly from the frame 12, generally parallel to one another.

A transverse beam 28 extends between the upper lift arms 24. The transverse beam 28 is connected to the upper lift arms 24 at a position outwardly spaced from the first end of the upper lift arms, between the first end 26 and second end 40. The transverse beam 28 is fixedly connected to each of the upper lift arms 24 such that a force applied to the transverse beam 28 will cause the upper lift arms 24 to pivot about the first end 26.

A pair of lower lift arms 30 extend from a lower portion 16 of the frame 12. The lower lift arms 30 have a first end 32 pivotally connected to opposing sides of the lower portion 16 of the frame 12. The lower lift arms 30 extend outwardly from the lower portion 16 of the frame 12, generally parallel to each other. An implement 34 may be positioned between the outwardly extending second ends 36 of each of the lower lift arms 30.

An adjustable lift arm 38 extends from each of the upper lift arms 24 to a corresponding lower lift arm 30. The adjustable lift arms 38 are pivotally connected to a second, outwardly extending end 40 of the upper lift arms 24. The adjustable lift arms 38 are adjustably connectable to the lower lift arms 30. The lower lift arms 30 have a series of apertures 42 along a length of the lower lift arm 30. The adjustable lift arms 38 have a mating aperture 44 that is selectively alignable with any of the series of apertures 42 on the lower lift arm 30. The adjustable lift arms 38 are connected to the lower lift arms 30 by extending a pin 46 through the mating aperture 44 and corresponding aperture 42 of the lower lift arms 30. The body 48 of the adjustable lift arms 38 may include a ball swivel and clevis.

A link arm 50 is pivotally connected to the frame 12, and extends therefrom for linking to an implement. The link arm 50 is able to extend generally outwardly in the direction of the upper lift arms 24 and lower lift arms 30. The link arm 50 may pivot within a range extending from the lower portion 16 of the frame 12 to an upper portion 14 of the frame 12.

A hitch tube 52 extends from the frame 12, in a direction opposite that in which the upper lift arms 24 and lower lift arms 30 extend. The hitch tube 52 is connected to the lower portion 16 of the frame 12. The hitch tube 52 allows the implement mounting fixture 10 to be mounted to a work machine by receiving a hitch (not shown) from the work machine. The hitch tube 52 may have adjustable or additional components to allow the hitch tube 52 to mate with a work machine. The hitch tube 52 allows the implement mounting fixture 10 to mount to the work machine at a single point, allowing the implement mounting fixture 10 to be mounted to a wide variety of work machines, and to be mounted on either the front or rear of the work machines. The hitch tube 52 may be a two inch hitch tube. Adjustable or additional components may include a 1¼ inch hitch bar, and a pair of ⅜ spacers, but are not limited thereto.

A hydraulic cylinder 54 extends from the frame 12 to the transverse beam 28. The hydraulic cylinder 54 has a first end 56 connected to the lower portion 16 of the frame 12. The hydraulic cylinder 54 has a second end 58 connected to the transverse beam 28. A connecting member 60 connects the hydraulic cylinder 54 to the transverse beam 28. The connecting member 60 may include a bracket, or other such mechanical connection. The hydraulic cylinder 54 is selectively positionable on the frame 12. It is contemplated that when the implement mounting fixture 10 is mounted on a work machine the hydraulic cylinder 54 be positioned on a side of the frame 12 opposite an exhaust system of the work machine.

The use of hydraulics provides a lifting and downward force in operation. The hydraulic cylinder 54 may provide a predetermined force, either generally upwardly or generally downwardly upon the transverse beam 28, causing the upper lift arms 24 to pivot about the upper portion 14 of the frame. This force results in a corresponding translation of force to the lower lift arms 30 via the adjustable lift arms 38 connected thereto.

Figure 2:
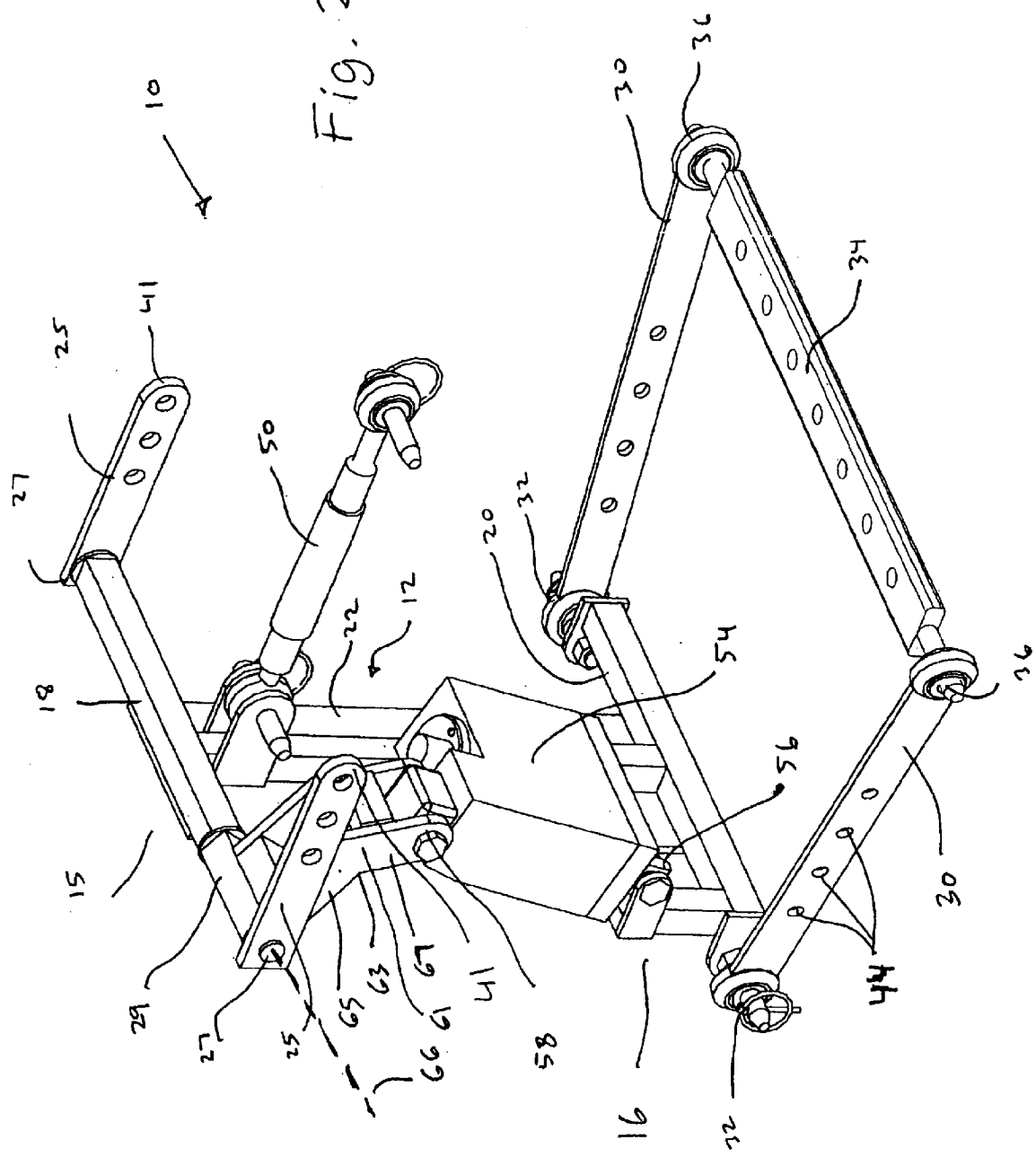
FIG. 2 is a perspective view of a second embodiment of the present invention.

FIG. 2 illustrates a second embodiment of the present invention of an implement mounting fixture for mounting an implement to a work machine.

The implement mounting fixture 10 has a frame 12 having an upper portion 15 and a lower portion 16. A transverse beam 29 extends through the upper portion 15 of the frame 12. The transverse beam 29 defines an axis 66 about which the transverse beam 29 is able to rotate while being maintained within the upper portion 15 of the frame 12.

A pair of upper lift arms 25 are connected to opposing ends of the transverse beam 29. The pair of upper lift arms 25 have a first end 27 fixedly connected to the transverse beam 29 such that when the transverse beam 29 is rotated about the axis 66 the pair of upper lift arms 25 will likewise rotate.

A connecting member 61 extends from the transverse beam 29, perpendicular to the axis 66. The connecting member 61 has an angle point 63 such that it extends outwardly from the transverse beam 29 for a predetermined distance and then angles for a predetermined distance, forming a perpendicular section 65, and an angled section 67.

A hydraulic cylinder 54 extends from the frame 12 to the transverse beam 29. The hydraulic cylinder 54 has a first end 56 connected to the lower portion 16 of the frame 12. The hydraulic cylinder 54 has a second end 58 connected to the transverse beam 29, via the connecting member 61. The second end 58 of the hydraulic cylinder 54 is connected to the angled section 67 of the connecting member 61.

The hydraulic cylinder 54 may provide a predetermined force, either generally upwardly or generally downwardly upon the connecting member 61, causing the corresponding rotation of the transverse beam 29. The rotation of the transverse beam 29 causes the upper lift arms 25 to rotate with respect to the upper portion 15 of the frame.

As discussed with reference to FIG. 1, the application of a force upon the upper lift arms 25 results in a corresponding translation of force applied to the lower lift arms 30 via the adjustable lift arms 38 connected thereto.

The embodiment of FIG. 2 has a pair of lower lift arms 30 extending from the lower portion 16 of the frame 12, and a pair of adjustable lift arms 38 extending between the upper lift arms 25 and lower lift arms 30. A lift arm 50 is pivotally connected to the frame 12. And a hitch tube 52 is connected to the opposite side of the frame 12. These elements are described in detail with reference to FIG. 1.

What is claimed is:

1. An implement mounting fixture comprising:
   a) a frame;
   b) a pair of upper lift arms extending outwardly from an upper portion of said frame;
   c) a transverse beam extending between and connecting said pair of upper lift arms;
   d) a hydraulic cylinder extending from said frame to said transverse beam;
   e) a link arm having a first end pivotally connected to said frame;
   f) a pair of lower lift arms extending outwardly from a lower portion of said frame;
   g) each of said pair of upper lift arms having an adjustable arm connecting it to a corresponding lower lift arm; and
   h) a hitch tube extending from said frame for mounting said implement mounting fixture to a work machine.

2. The implement mounting fixture according to claim 1 wherein said pair of upper lift arms are pivotally connected to opposing sides of said upper portion of said frame.

3. The implement mounting fixture according to claim 1 wherein an implement extends between an outwardly extending end of each of said pair of lower lift arms.

4. A hitch assembly for mounting an implement to a work machine, comprising:
   a) a frame;
   b) a pair of upper lift arms extending outwardly from an upper portion of said frame, each of said pair of upper lift arms having a first end pivotally connected to said frame;
   c) a transverse beam extending between said pair of upper lift arms, said transverse beam being connected to each of said pair of upper lift arms at a position outwardly spaced from said first end of said pair of upper lift arms;
   d) a hydraulic cylinder extending from said frame to said transverse beam;
   e) a pair of lower lift arms extending outwardly from a lower portion of said frame, each of said pair of lower lift arms having a first end pivotally connected to said frame;
   f) a pair of adjustable lift arms, each interconnecting one of said pair of upper lift arms to a corresponding one of said pair of lower lift arms; and
   g) a hitch tube extending from said frame for mounting said hitch assembly to a work machine.

5. The hitch assembly according to claim 4 wherein said pair of adjustable lift arms are connected to said upper and lower lift arms at positions spaced outwardly from said first ends.

6. The hitch assembly according to claim 4 wherein a link arm is pivotally connected to said frame.

7. A hitch assembly for mounting an implement to a work machine comprising:
   a) a frame having an upper portion and a lower portion;
   b) a transverse beam extending through said upper portion of said frame and defining an axis, said transverse beam being rotatable about said axis;
   c) a connecting member extending from said transverse beam, perpendicular to said axis;
   d) a pair of upper lift arms fixedly connected at opposing ends of said transverse beam;
   e) a pair of lower lift arms pivotally connected to, and extending from, said lower portion of said frame;

f) a cylinder having a first end extending from said lower portion of said frame and a second end extending to said connecting member;

g) a link arm having a first end pivotally connected to said frame; and h) a hitch tube extending from said frame for mounting said hitch assembly to a work machine.

8. The hitch assembly according to claim 7 an adjustable lift arm extends from each of said pair of upper lift arms to a corresponding one of each of said pair of lower lift arms.

9. The hitch assembly according to claim 8 wherein an implement is positioned between an outer end of each of said pair of lower lift arms.

* * * * *